No. 650,836. Patented June 5, 1900.
S L. WIEGAND.
SECONDARY BATTERY.
(Application filed Nov. 28, 1899.)
(No Model.) 2 Sheets—Sheet 1.
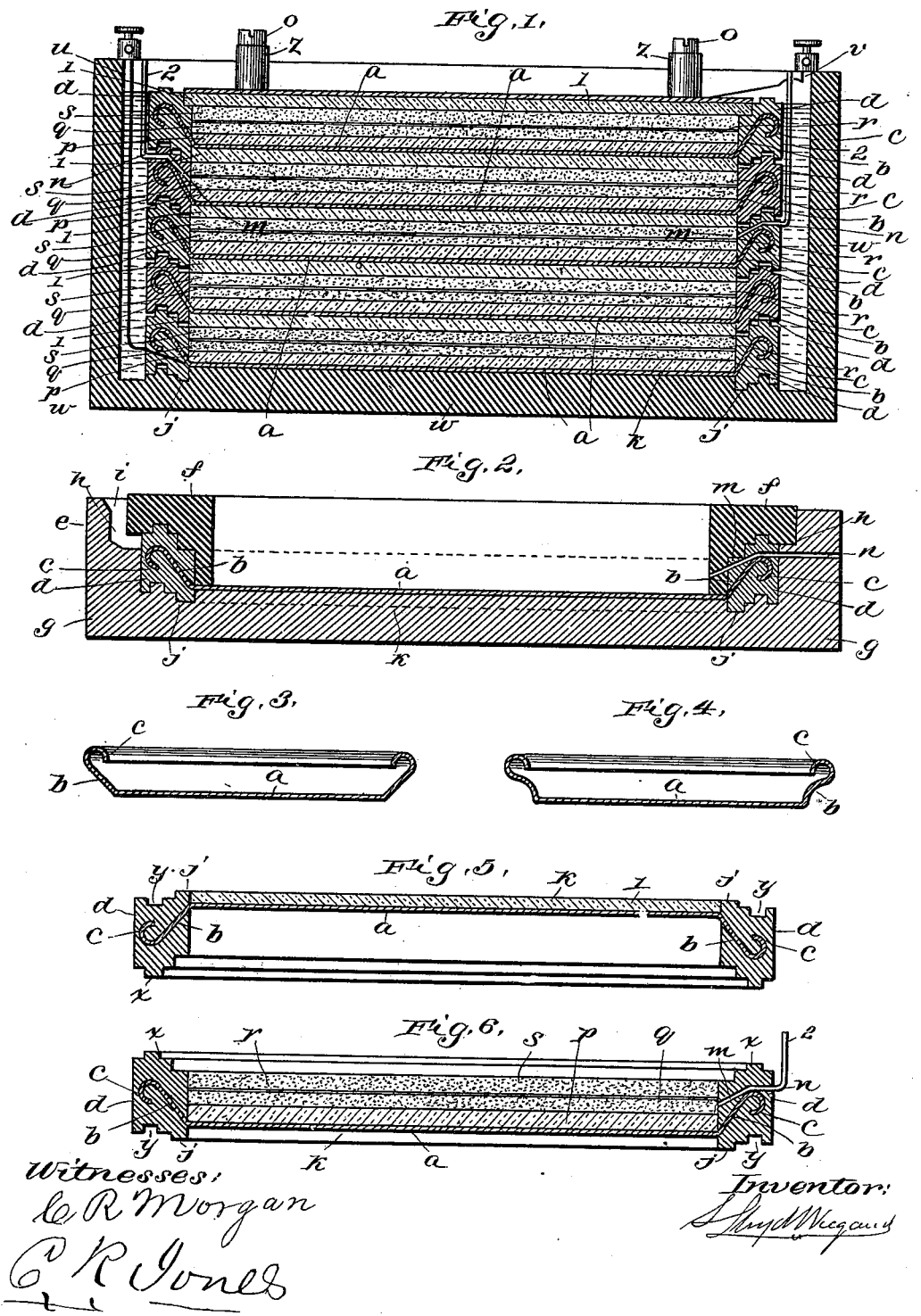

No. 650,886. Patented June 5, 1900.
S. L. WIEGAND.
SECONDARY BATTERY.
(Application filed Nov. 28, 1899.)
(No Model.) 2 Sheets—Sheet 2.

Witnesses:
C R Morgan
C R Jones

Inventor:
S Lloyd Wiegand

UNITED STATES PATENT OFFICE.

S LLOYD WIEGAND, OF PHILADELPHIA, PENNSYLVANIA.

SECONDARY BATTERY.

SPECIFICATION forming part of Letters Patent No. 650,886, dated June 5, 1900.

Application filed November 28, 1899. Serial No. 738,592. (No model.)

*To all whom it may concern:*

Be it known that I, S LLOYD WIEGAND, a citizen of the United States, residing at Philadelphia, Pennsylvania, have invented certain new and useful Improvements in Secondary Electric or Storage Batteries and Elements Therefor, of which the following is a specification.

This invention relates to secondary or storage electric batteries, and has for its object an improved construction thereof less liable to impairment from shocks and jars in transportation, better facilities for inspection when forming, or converting the chemical material into active material, for testing when in use, for constantly maintaining the insulation between the several elements of the battery, even though portions of the insulating parts may be fractured, and for supplying additional electrolytic fluid to dry batteries with reduced risk of short-circuiting or impairing the insulation of any of the elements.

To this end the invention consists in an improved form of plates or vessels, constituting the conducting septa between the electrically positive and negative strata of active material of which the battery consists; in an improved rim or marginal ring of insulating material and means of attaching the same, and an improved mode of inclosing the several elements and sealing them together, and means of supplying a fusible or fluid non-conducting material whereby in the event of cracks or fractures in the insulating-rims of the plate the liquid insulating material instantly fills and closes such cracks or crevices between the fractured parts and continuously maintains insulation and also means of preventing the ingress of such non-conducting fluid into the active material or between the conducting-plates and active material to any such extent as to impair the efficiency of the battery, and means of continuously pressing the parts upon each other.

The construction and operation of this invention are hereinafter described, and shown in the accompanying drawings, in which—

Figure 7:
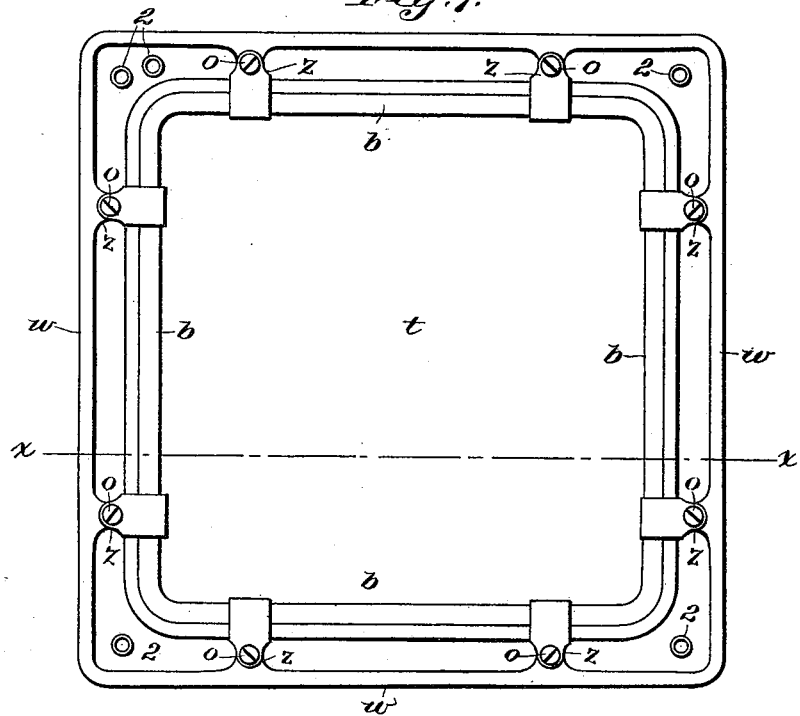
Figure 8:
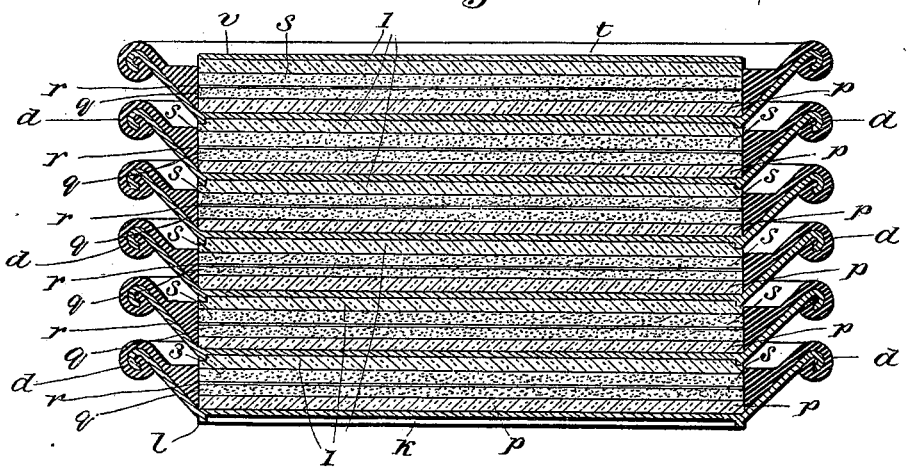

Figure 1 shows a vertical section of a battery embodying this invention, taken on the line X X in Fig. 7. Fig. 2 shows an enlarged section of one of the conducting pans or plates with the insulating-rim attached and a mold by means of which such rims are applied. Fig. 3 shows a section of a modified form of plate, and Fig. 4 another modification thereof. Fig. 5 shows in section a conducting-plate in inverted position with its attached insulating-ring containing on one side a coating of material adapted to become active. Fig. 6 shows in section a like plate with the material adapted to become active placed in it and the interposed absorbent material for holding the electrolytic liquid, the section being taken through the vent $m$ and the tube $n$, showing the pipe 2 connected with the tube $n$. Fig. 7 shows a plan of a complete battery, and Fig. 8 shows a vertical section of a cheaper form of the battery adapted to stationary service.

Referring to the drawings, $a$ represents one of the conducting-plates, having inclined raised sides $b$, forming a pan. The rim $c$ of the sides is curved in cross-section, so as to form an annular groove, into which a fusible or plastic non-conducting material is cast or attached when in fused or plastic condition, thus forming a complete covering or insulating-ring $d$ for the pan-rims. The grooved portion of the latter is also filled or occupied by the said material of which the ring $d$ is composed, and the opening of the annular groove being smaller than the bent or loop portion. This ring is composed of a cement made of sulfur, resin, talc, and wax. The curved rim $c$ is shown as bent downwardly and inwardly from the side of the vessel in the form depicted in Figs. 1, 2, 5, 6, and 8. In the form shown in Figs. 3 and 4 it is turned inwardly and downwardly; but the operation and purpose are the same in both instances, and other forms of side and rim possessing the property of forming a lock or key into which the ring $d$ engages may be substituted without departing from the essential features of this device. The insulating-ring, of fusible material or cement, (marked $d$,) may be cast upon the pans in a mold $e$, (shown in Fig. 2,) consisting of two parts $f$ and $g$, which fit into each other with interlocking shoulders $h$ and receive the liquid material through a gate or channel $i$ and hold the plate $a$ by grasping it between the part $f$, which fits within the bottom of the pan, and the part $g$, which is opposed to it, and clamp the pan in position, so that the rings are always in parallel position relatively to each other, as is also the rim $j$ underneath, inclosing a space or cavity $k$, as shown in Figs. 5 and 6, into which space material—such as litharge, in paste or putty—is filled or spread of a uniform depth and flush with the rim $j$. Through the rim $d$ of each pan $a$ a vent or opening $m$ is made, through which electrolytic-liquid may be introduced, as hereinafter explained, by a tube $n$, connected therewith, and with a tube 2, so as to reach the top of the battery when the whole is assembled in its case for use. In Fig. 5 a pan is shown upside down to facilitate the filling of the lower cavity $k$ within the rim $j$. The rims $d$ on the pans $a$ may be made with tongues $x$ and grooves $y$, as shown in sectional outline in Figs. 2, 3, and 6, which facilitate centering them when assembled in piles for use. The plates are formed of sheet-lead, preferably of one and one-half to two and one-half pounds weight per square foot, according to the size of the battery and the service for which it is designed to be used.

The lower cavity $j$ may be filled with a stratum $l$ of paste or plaster of litharge moistened with electrolytic liquid and firmly placed. A like thickness of moistened material—say red lead and acidulated water—is put in the bottom of the pan $a$ in a level stratum $p$, above which a stratum $q$ of absorbent material not susceptible of impairment by the electrolytic liquid is placed. Powdered carbon will answer the purpose or sand of uniform size of grains. The necessity for uniform size of grains arises from the fact that in sand having grains of unequal size a settling or subsidence takes place by jarring. The smaller particles pass downwardly, letting the mass of sand settle lower, which settling does not occur when the sand is of uniform size of grains. A stratum of asbestos, felt, or paper $r$ or of perforated mica may be laid on the stratum P, but is not essential, and another absorptive layer of sand or carbon $s$ placed upon it. These several pans $a$ are placed in a pile with the bottom cavity $k$ of the lowest conducting-plate empty and the others charged, as described, successively superposed, and a conducting-plate $t$ laid upon the top of the active material in the uppermost pan. The pans are then charged with electrolytic liquid and constant pressure applied upon the top of the pile.

Electric conductors $u$ and $v$ are attached to the bottom pan and to the plate $t$ while the pans stand in a vertical pile and the contained strata being horizontal. The electrical conductors $u$ and $v$, respectively, are placed in connection with an electric generator, and a current is transmitted through the series of pans and the contained strata. The lead salts upon one side of each plate is thereby converted into lead peroxid and that upon the other side of each plate is turned into spongy metallic lead. This operation is continued until the formation of the spongy metallic lead from the lead oxid is completed on one side of each plate.

The electric conductivity of the plates is tested and also the insulation between them, and if conditions are found to be satisfactory under electric tests they are then charged by an electric current, are next connected with an apparatus by which they may be discharged, and are then recharged for the purpose of testing their working capacity, after which they are clamped firmly with each other and sealed together, as hereinafter described, but can be used without sealing in stationary service. Such a battery is shown in Fig. 8 in section, in which case the insulating coating or coverings $d$ of the rims $c$ need not contact with each other, and a rim $l$ may be formed on the bottoms of the pans from the material of the pans to inclose the space $k$, as shown in Fig. 8.

A connected tube 2 leads from each pan $a$ to the top of the pile, through which tubes additional electrolytic liquid may be introduced through the apertures $m$. Through these tubes and apertures gas may find vent and reëntrance. The whole is inclosed in a case $w$. In the case $w$ a non-conducting liquid, such as oil or paraffin or cement more fusible than the rims $d$, is filled around the pans $a$, rims $d$, and the tubes 2, so that when the battery is charged with electrolytic liquid in the several pans and with a non-conducting liquid or fusible cement around the several pans any accidental crack or break of any of the insulating-rims $d$ instead of permitting electrolytic fluid to pass through the crevice, and thus short-circuiting parts of the pile, the crevices are promptly filled and stopped with the said surrounding non-conducting liquid, and the insulation is thus permanently maintained, notwithstanding such accidents.

The tubes 2 can be made of insulating material or of conducting material. The tubes 2 when made of conducting material are insulated from each other, and being electrically connected with each pan $a$ are useful to test electrically and locate any fault in the performance of the battery. If made of insulating material, they can be filled with a conducting liquid and substantially answer the same purpose. The surrounding column of insulating liquid should be equal to or slightly greater in static pressure than that of the electrolytic liquid column, so that in the event of fracture or cracking of any of the rims $d$ an inward flow of insulating material will prevent an outward flow of electrolytic liquid. Clamps $z$ and screws $o$ are provided to hold the rims $d$ in close contact when the pans are assembled in a battery. Springs or weights may be used instead of clamps and screws to accomplish the same purpose.

The active materials, which are operative by electrically-disturbed chemical affinity, are the spongy metal and the metallic oxid, the plates or pans operating as containing vessels and electrical conductors. If made of material incapable of corrosion by the electrolytic liquid, they may be very thin, but such materials being expensive rolled sheet-lead, being cheaper, is used, and no appreciable diminution thereof in weight or impairment of solidity appears under a test of eighteen months' use.

It will be observed in this battery that the opposite sides of each plate are positively and negatively electrified, and operating with several plates in series produce directly a higher voltage than the usual construction of storage batteries where the alternate plates are positive and negative connected in multiple.

Having described this invention, what I claim is—

1. In a storage battery metallic flat-bottomed pans or like receptacles for holding active material, or material adapted to become active, each of said pans having an annular rim integrally formed therewith of hook-shaped cross-section and non-conducting rings cast or formed in and on said rims to envelop the same as set forth.

2. In a secondary or storage battery, flat-bottomed metallic pans or receptacles, adapted in horizontal position to retain strata of active material, having upwardly-projecting sides and a rim hook-shaped in cross-section on said sides, adapted to retain non-conducting material, and a downwardly-projecting rim inclosing the edges of a cavity on the under side of said pans, adapted to receive active material, said sides, rims and pan-bottoms being integrally formed as set forth.

3. In a secondary or storage battery, a series of flat-bottomed pans, each having sides formed integrally therewith rings of insulating material formed thereon, inclosing cavities each charged with strata of active material with an interposed stratum of absorbent material, in combination with an inclosed case, tubes leading from each cavity to the top of said case, and an envelop of non-conducting material surrounding said pans and rings inclosed in said case, as set forth.

4. A secondary or storage battery consisting of a case, flat-bottomed pans with rims integrally formed therewith having fusible insulating-rings formed thereon, adapted to fit upon each other and having cavities containing strata of active material and intermediate absorbent strata, vents connected with said cavities, tubes leading from each cavity to the top of the battery-case, and an envelop of non-conducting material in said case more fusible than the insulating-rings and surrounding said pans and rings, in combination with means of pressing said pans, rings, and inclosed strata upon each other, as set forth.

5. A secondary battery consisting of a series of superposed flat-bottomed pans, having each an annular rim of hook-shaped cross-section adapted to laterally confine active material or material adapted to become active, and an electrolytic liquid, in combination with insulating-coverings in and on the hooked rim of said pans, layers of active material in said pans, separated by one or more layers of absorbent material charged with a liquid electrolyte and terminal conductors connected with the top and bottom pans of the series as set forth.

6. In a secondary battery, a series of horizontal imperforate flat-bottomed pans, having rims formed integrally therewith, one side of said bottom being of positive, and the other of negative polarity, a cement ring surrounding a stratum of active material upon each side of the pans, and a stratum of absorbent material charged with an electrolytic liquid between the strata of active material in adjacent pans, said pans being arranged to form conductors between the said strata of active material when piled upon each other as set forth.

7. The combination in a storage battery of a pan having a flat imperforate bottom forming a conducting-plate, and an annular rim hook-shaped in cross-section formed integrally with the pan-bottom, and a ring of fusible non-conducting material cast or molded around said hooked rim substantially as set forth.

8. An improved conducting-plate for tension storage batteries, consisting of an integrally-formed flat-bottomed metallic pan, having upwardly and outwardly inclined sides said sides terminating in an annular rim of hook-shaped cross-section having its edge free from contact with the side of the pan and inclosing a groove of greater diameter than the space between the edge of the rim and the side of the pan and retaining a ring of non-conducting material in the groove, and the flat bottom of the pan, adapted to support horizontal strata of active material and an absorbent material charged with electrolytic liquid as set forth.

S LLOYD WIEGAND.

Witnesses:
GEORGE HIRST,
C. R. MORGAN.